(12) United States Patent
Daimon et al.

(10) Patent No.: US 9,816,657 B2
(45) Date of Patent: Nov. 14, 2017

(54) PIPE FITTING

(75) Inventors: Satoshi Daimon, Koga (JP); Satoshi Matsubara, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 882 days.

(21) Appl. No.: 13/818,971

(22) PCT Filed: Jul. 20, 2012

(86) PCT No.: PCT/JP2012/068511
§ 371 (c)(1),
(2), (4) Date: Feb. 25, 2013

(87) PCT Pub. No.: WO2013/018562
PCT Pub. Date: Feb. 7, 2013

(65) Prior Publication Data
US 2013/0154255 A1  Jun. 20, 2013

(30) Foreign Application Priority Data
Aug. 1, 2011 (JP) .................... 2011-168629

(51) Int. Cl.
*F16L 37/12* (2006.01)
*F16L 37/088* (2006.01)

(52) U.S. Cl.
CPC ............. *F16L 37/12* (2013.01); *F16L 37/088* (2013.01); *F16L 2201/10* (2013.01)

(58) Field of Classification Search
USPC ............. 285/305, 321, 308, 310, 319, 921
See application file for complete search history.

(56) References Cited

U.S. PATENT DOCUMENTS

| | | | | |
|---|---|---|---|---|
| 4,524,995 A | * | 6/1985 | Bartholomew | F16L 37/0987 285/281 |
| 4,946,205 A | * | 8/1990 | Washizu | 285/319 |
| 5,090,747 A | * | 2/1992 | Kotake | F16B 21/16 285/305 |
| 5,683,117 A | * | 11/1997 | Corbett et al. | 285/24 |
| 5,863,077 A | * | 1/1999 | Szabo | F16L 37/144 285/3 |

(Continued)

FOREIGN PATENT DOCUMENTS

| JP | 6207696 A | 7/1994 |
|---|---|---|
| JP | 10509232 | 9/1998 |

(Continued)

OTHER PUBLICATIONS

International Search Report for PCT/JP2012/068511 dated Sep. 4, 2012.

*Primary Examiner* — Aaron Dunwoody
*Assistant Examiner* — Fannie Kee
(74) *Attorney, Agent, or Firm* — Marshall, Gerstein & Borun LLP

(57) ABSTRACT

A pipe fitting having a main body portion into which a retainer is inserted and which, when inserted over a pipe, a flange provided to the pipe contacts first taper portions formed to a front side of the retainer, pushes out the first taper portions, and passes by the retainer. When the main body portion is pulled off the pipe, the flange contacts second taper portions formed to a rear side of the retainer, pushes out the second taper portions and passes by the retainer.

4 Claims, 9 Drawing Sheets

(56) References Cited

U.S. PATENT DOCUMENTS

| | | | |
|---|---|---|---|
| 5,897,145 A * | 4/1999 | Kondo | F16L 37/0987 |
| | | | 285/319 |
| 7,044,505 B2 * | 5/2006 | Takayanagi | 285/93 |
| 7,484,774 B2 * | 2/2009 | Kerin | F16L 37/088 |
| | | | 285/305 |
| 2006/0082145 A1 * | 4/2006 | Steveley | F16L 37/144 |
| | | | 285/305 |
| 2006/0103134 A1 * | 5/2006 | Kerin | F16L 37/088 |
| | | | 285/305 |
| 2006/0267341 A1 | 11/2006 | Takayanagi | |
| 2008/0048442 A1 * | 2/2008 | Kerin | F16L 25/01 |
| | | | 285/305 |

FOREIGN PATENT DOCUMENTS

| | | |
|---|---|---|
| JP | 2005172161 A | 6/2005 |
| JP | 2006316944 A | 11/2006 |
| JP | 2007255669 A | 10/2007 |
| JP | 2009024800 A | 2/2009 |

* cited by examiner

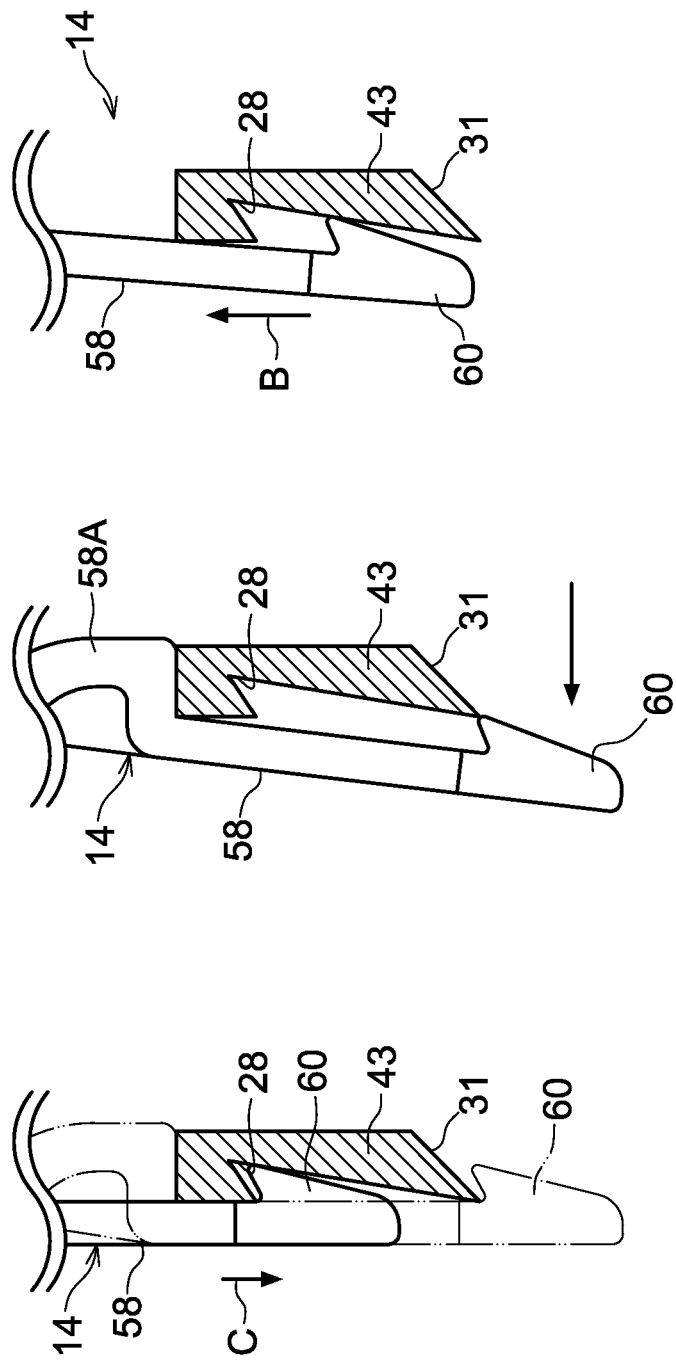

PIPE FITTING

TECHNICAL FIELD

The present invention relates to a pipe fitting that is connected to a pipe.

BACKGROUND ART

In pipes such as automobile fuel supply pipes, quick connectors equipped with a main body portion and a retainer are employed as pipe fittings that are connected to pipes (pipes, tubes). A tube is pre-connected to a first end of the main body portion, and the other end of the main body portion is inserted over a pipe of a device body to perform connection to the pipe. After the main body portion has been connected to the pipe, the retainer is pushed towards the main body portion such that the quick connector cannot come away from the pipe.

Such quick connectors are disclosed in for example Japanese National-Phase Publication No. 10-509232 and Japanese Patent Application Laid-Open (JP-A) No. 2005-172161 wherein in a quick connector a locked state of a retainer is released by inserting a pipe as far as a specific position in the main body portion, such that it is possible to push the retainer into the main body portion.

JP-A No. 2009-24800 discloses a quick connector that is inserted onto a pipe with the retainer in a pre-attached state to the main body portion, and the pipe and the main body portion are connected and the main body portion is prevented from coming off from the pipe.

SUMMARY OF INVENTION

Technical Problem

However, the quick connectors require a double-action since the retainer cannot be pushed in if the pipe has not been inserted to the specific position. There is also the concern that the operation to push in the retainer is difficult in narrow spaces, with a reduction in operation efficiency.

In the quick connector disclosed in JP-A No. 2009-24800, connection and prevention of the connector from coming off can be performed by pushing onto the pipe, however when the connector is removed, the retainer comes away from the main body portion with the pipe. There is therefore a concern of losing the retainer when working in poor light.

In consideration of the above circumstances, the present invention is concerned with providing a pipe fitting wherein connection and prevention from coming off of the main body portion and a pipe can be performed with a single action, and the main body portion can be removed from the pipe without removing the retainer (retaining member) from the main body portion.

Solution to Problem

A pipe fitting of a first aspect of the present invention includes: a main body portion formed with a connection opening into which is inserted a pipe provided with a ring-shaped projection at an outer periphery thereof; a retaining member attached to the main body portion so as to be capable of movement between a first position and a second position in a radial direction of the connection opening; a pair of leg portions that are provided at the retaining member and that jut out into the connection opening and engage a ring-shaped projection of an inserted pipe so as to prevent the pipe from being pulled out when the retaining member is in the first position; first tapered portions that are formed at front sides of the leg portions, and that make contact a ring-shaped projection of a pipe that is being inserted into the connection opening, deform the leg portions toward an outer side in the radial direction and allow the ring-shaped projection to pass by when the retaining member is in the first position; and second tapered portions that are formed at back sides of the leg portions, and that make contact a ring-shaped projection of a pipe that is being pulled out from the connection opening, deform the leg portions toward the outer side in the radial direction and allow the ring-shaped projection to pass when the retaining member is in the second position.

In the pipe fitting of the first aspect of the present invention, when the main body portion is inserted over a pipe with the retaining member is in the first position, the first taper portions that are formed to the front sides of the leg portions of the retaining member contact the ring-shaped projection portion formed to the pipe and are pushed out towards the radial direction outside, allowing the ring-shaped projection portion to pass by. After the leg portions have allowed the ring-shaped projection portion to pass by, the pushed out leg portions return to their original position, anchoring the ring-shaped projection portion and preventing the main body from coming off the pipe. Such a configuration allows connection and coming-off prevention of the main body portion to the pipe to be performed in a single action.

In an inserted state of the main body portion to the pipe, when the pipe fitting is being pulled off after moving the retaining member to the second position, the second taper portions that are formed to the rear sides of the leg portions contact the ring-shaped projection portion and are pushed out towards the radial direction outside, allowing the ring-shaped projection portion to pass by. Such a configuration allows the main body portion to be pulled off the pipe without removing the retaining member from the main body portion.

A pipe fitting of a second aspect of the present invention is the pipe fitting of the above first aspect wherein leading end portions of the leg portions are in contact with the main body portion when the retaining member is in the first position.

In the pipe fitting of the second aspect of the present invention, even when there is an attempt to pull off the main body portion from the pipe in a state with the retaining member in the first position, the leg portions provided to the retaining member flex less readily than in cases in which the leading ends of the leg portions are free ends, since the leading end portions of the leg portions are in contact with the main body portion. The main body portion does not come off the pipe, and the state in which coming-off is prevented is maintained whilst the retaining member is being moved from the first position to the second position, since the leg portions have a long length.

A pipe fitting of a third aspect of the present invention is the pipe fitting of the first aspect or the second aspect above wherein the retaining member is provided with a locking section that anchors to the main body portion in the first position and the second position.

In the pipe fitting of the third aspect of the present invention, the retaining member cannot be removed from the main body portion even if the retaining member is moved, since the retaining member is anchored to the main body portion by the locking section.

A pipe fitting of a fourth aspect of the present invention is the pipe fitting of the third aspect above wherein: the locking section includes a pair of arm members extending toward an outer side of the leg portions with locking hooks formed at leading end portions of the arm members, the locking hooks anchoring to anchor holes in the main body portion when the retaining member is in the first position or the second position; and the anchoring with the anchor holes is released when the locking hooks anchored to the anchor holes in the first position are moved in a direction approaching each other and the retaining member moves towards the second position due to a recovery force of the arm members attempting to return to their original orientation.

In the pipe fitting of the fourth aspect of the present invention, when the main body portion is being pulled off the pipe, the retaining member can easily be moved from the first position to the second position simply by moving the locking hooks of the retaining member in a direction approaching each other.

A pipe fitting of a fifth aspect of the present invention includes a connection completion verification member that is attached to the main body portion. Anchoring of the connection completion verification member to the main body portion is released by contact with a ring-shaped projection of a pipe that has been inserted into the connection opening and passed the first tapered portions such that the connection completion verification member is able to be removed from the main body portion or tuck into the main body portion.

In the pipe fitting of the fifth aspect of the present invention, it is possible to visually verify that connection of the pipe fitting has been completed by verifying whether the connection completion verification member of the pipe fitting has been pulled off, or whether the connection completion verification member has been pushed towards the main body portion.

Advantageous Effects of Invention

Due to the above configuration, the present invention can provide a pipe fitting wherein connection and prevention from coming off of the main body portion and a pipe can be performed with a single action, and the main body portion can be removed from the pipe without removing the retaining member from the main body portion.

BRIEF DESCRIPTION OF DRAWINGS

FIG. 4A is a schematic drawing showing a state in which a retainer configuring a pipe fitting according to the first exemplary embodiment is moving from a second position to a first position.

FIG. 4B is a schematic drawing showing a state in which a retainer configuring a pipe fitting according to the first exemplary embodiment is moving from the first position to the second position.

FIG. 4C is a schematic drawing showing a state in which a retainer configuring a pipe fitting according to the first exemplary embodiment is moving from the first position to the second position.

DESCRIPTION OF EMBODIMENTS

Explanation follows regarding a pipe fitting according to a first exemplary embodiment of the present invention, with reference to the drawings.

Figure 1:
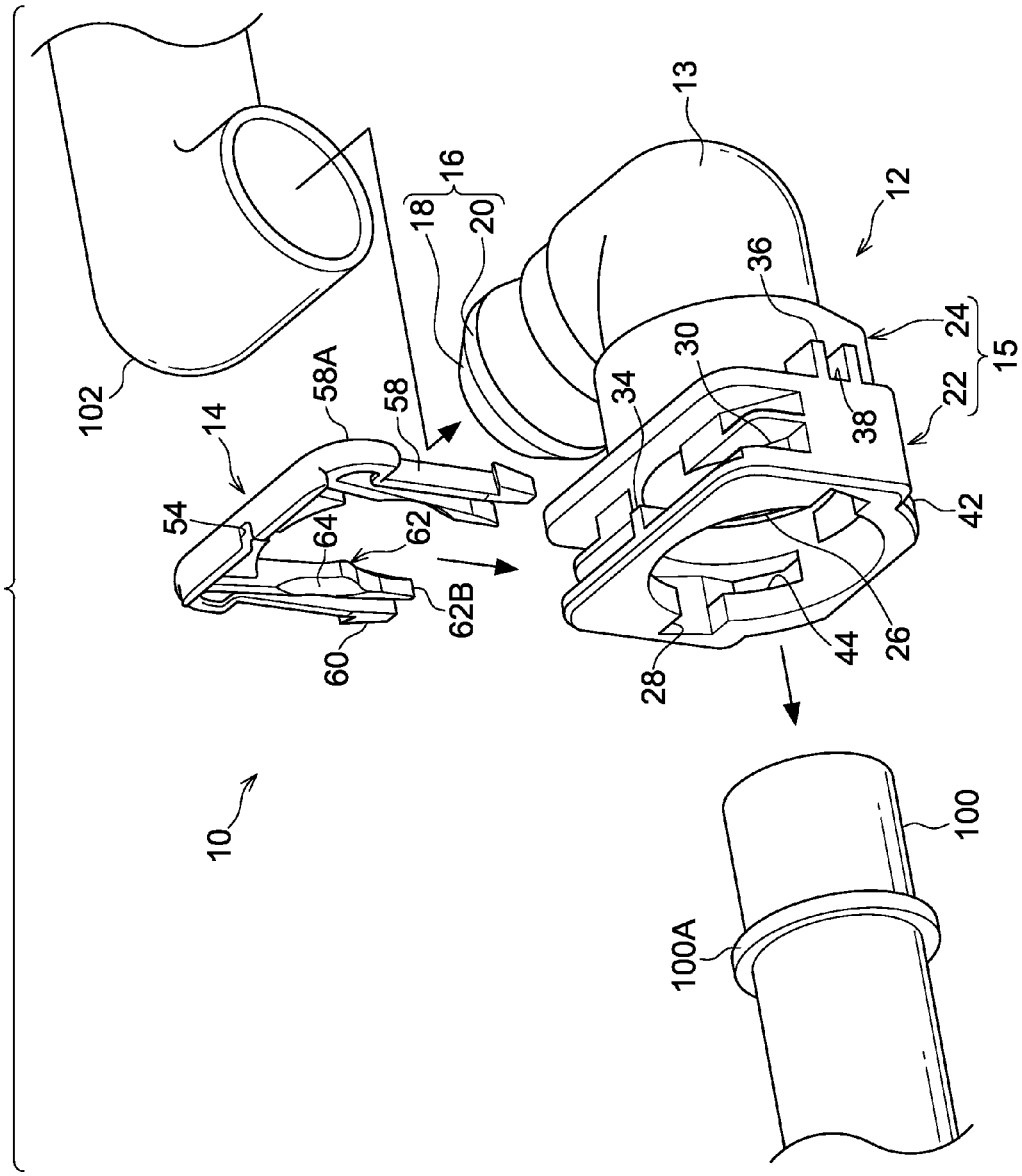
FIG. 1 is an exploded perspective view of a pipe fitting according to a first exemplary embodiment.

As shown in FIG. 1, a pipe fitting 10 according to the first exemplary embodiment of the present invention is provided with a main body portion 12 that is an L-shaped cylindrical body open at both ends, that is integrally formed by for example injection molding. A first end portion of the main body portion 12 is formed with a pipe connection portion 15 with a connection opening 26 into which a pipe 100 formed with a ring shaped projection (flange) 100A around the outer periphery is inserted. The other end portion of the main body portion 12 is formed with a tube insertion portion 16 that is press fitted to a tube 102. A bend portion 13 is formed between the pipe connection portion 15 and the tube insertion portion 16. A retainer 14 is further attached to the pipe connection portion 15 and serves as a retaining member that is movable in the connection opening 26 radial direction.

In the present exemplary embodiment, the insertion direction of the pipe 100 into the pipe fitting 10 and the insertion direction of the tube 102 into the pipe fitting 10 are orthogonal to each other. However there is no limitation to the insertion angles provided that the pipe 100 is inserted into the first end portion and the tube 102 inserted into the other end portion. For example the axial direction of the pipe 100 that is inserted into the pipe fitting 10 and the axial direction of the tube 102 inserted into the pipe fitting 10 may be coaxial with each other.

Figure 2C:
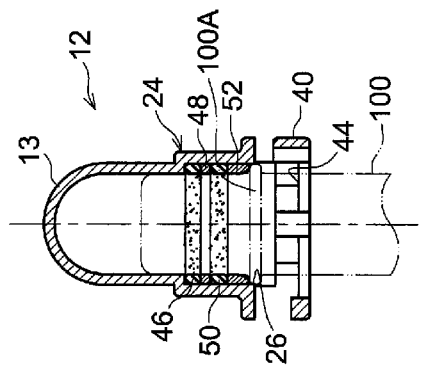
FIG. 2C is a cross-section taken along line C-C in FIG. 2A, illustrating a main body portion configuring a pipe fitting according to the first exemplary embodiment.
Figure 2A:
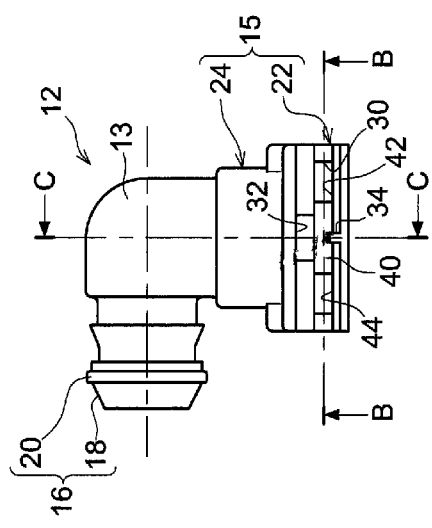
FIG. 2A is a top face view of a main body portion configuring a pipe fitting according to the first exemplary embodiment.

As shown in FIG. 1 and FIG. 2, the tube insertion portion 16 has a circular cylinder shape, and is formed with a tapered portion 18 with a decreasing diameter on progression in the direction of insertion into the tube 102. An O ring 20 is provided at the larger diameter side of the tapered portion 18 of the tube insertion portion 16, forming a seal due to the O ring 20 contacting a peripheral inside wall of the press fitted tube 102.

The pipe connection portion 15 is configured by a square tube shaped retainer mounting portion 22 and a circular cylinder shaped pipe insertion portion 24. The connection opening 26 into which the pipe is inserted is open at an end portion of the retainer mounting portion 22.

The connection opening 26 penetrates from a first end side to the other end side of the retainer mounting portion 22 (see FIG. 1), and an upper face of the retainer mounting portion 22 is formed with a slit shaped retainer insertion opening 30 that is in communication with the connection opening 26. Through holes 42, 44 that are in communication with the connection opening 26 are formed at two locations around from a bottom face to side faces of the retainer mounting portion 22.

Figure 2B:
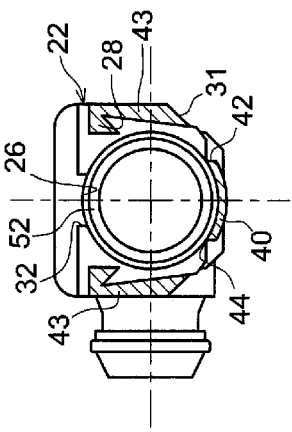
FIG. 2B is a cross-section taken along line B-B in FIG. 2A, illustrating a main body portion configuring a pipe fitting according to the first exemplary embodiment.

As shown in FIG. 2B, the through holes 42, 44 are respectively formed between both ends of a circular arc portion 40 that is formed at the bottom face of the retainer mounting portion 22, and side walls 43 of the retainer mounting portion 22. The retainer 14, described later, is inserted through the retainer insertion opening 30 and passes through the through holes 42, 44.

Notches 28 are formed to internal walls of the side walls 43 of the retainer mounting portion 22. Lower end portions of the side walls 43 are formed with inclined portions 31 such that inclined below from the outside of the retainer mounting portion 22 towards the inside of the retainer mounting portion 22.

As shown in FIG. 2C, an O ring 46, a spacer 48, an O ring 50 and a top hat 52 are fitted to the peripheral inside wall of the pipe insertion portion 24 in sequence from the bend portion 13 side towards the connection opening 26.

When the main body portion 12 is inserted over the pipe 100, the O rings 46, 50 contact the peripheral outside wall of the pipe 100 to the leading end side of the flange 100A of the pipe 100, closing and sealing the gap between the pipe 100 and the main body portion 12.

Explanation follows regarding the retainer configuring the pipe fitting of the present exemplary embodiment. Note that for ease of explanation, the center point of the retainer is referred to as point X, and a point positioned a specific length below the point X is referred to as point Y, as shown in FIG. 3B and FIG. 3C.

Figure 3A:
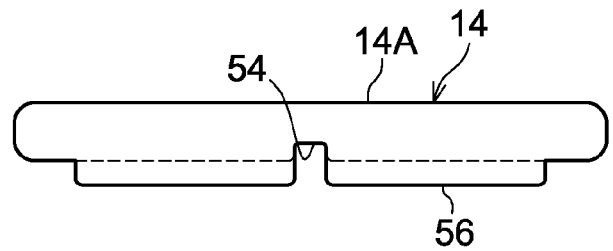
FIG. 3A is a top face view of a retainer configuring a pipe fitting according to the first exemplary embodiment.

As shown in FIG. 3A, the retainer 14 includes a base portion 14A at an upper portion. A key groove portion 54 is formed at a central portion of the base portion 14A. The key groove portion 54 corresponds to a projection portion 34 provided to an upper portion of the retainer mounting portion 22 (see FIG. 1). An upper portion of the base portion 14A is formed with projection portions 56 that project out in the retainer 14 thickness direction at both sides of the key groove portion 54. A lower end portion of the base portion 14A has a curved shape corresponding with the shape of the connection opening 26.

Figure 3B:
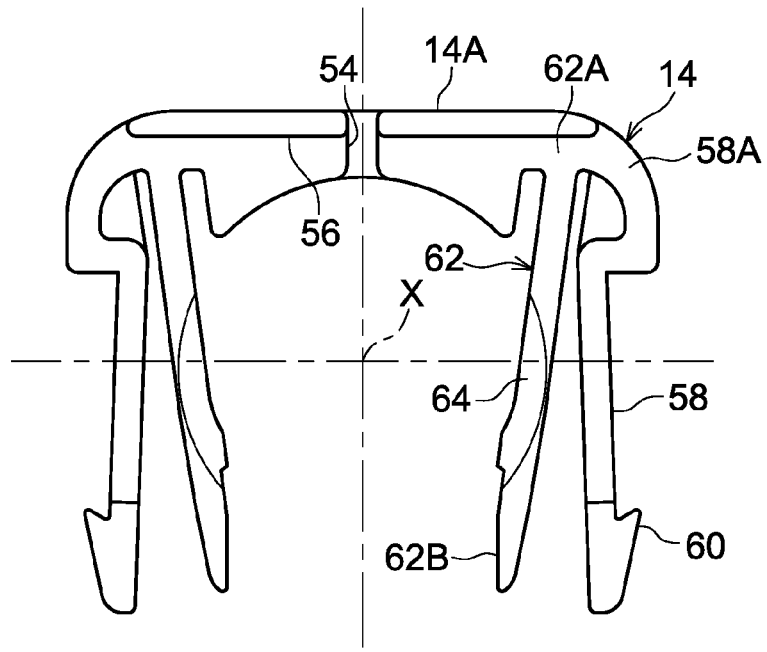
FIG. 3B is a front face view of a retainer configuring a pipe fitting according to the first exemplary embodiment.
Figure 3C:
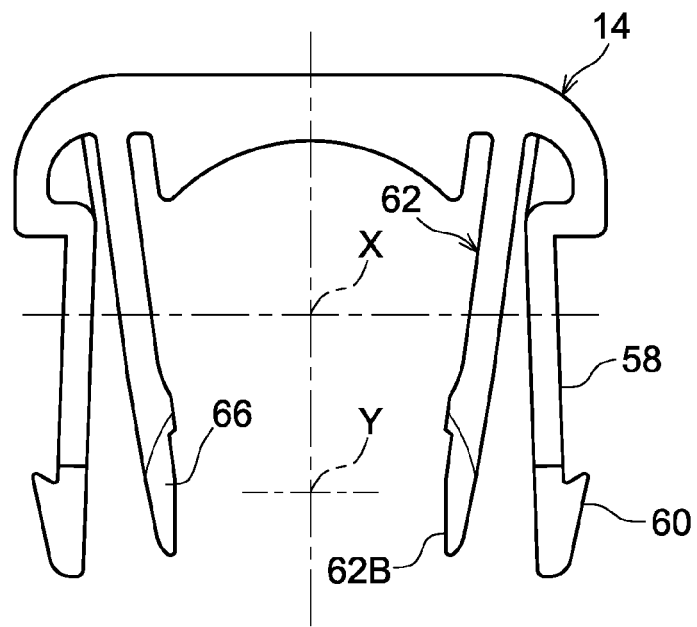
FIG. 3C is a back face view of a retainer configuring a pipe fitting according to the first exemplary embodiment.

As shown in FIG. 3B, a pair of guide legs 58 serving as a locking section extend downwards from the base portion 14A at both end portions of the base portion 14A. Leading end portions of the respective guide legs 58 are formed with locking hooks 60 that project towards the outside. The guide legs 58 are formed so as to be disposed further away from each other on progression towards the leading ends, and are configured so as to be capable of resilient deformation towards the inside about curved portions 58A formed to the base portion 14A.

A pair of leg portions 62 extend downwards from the base portion 14A at the inside of the guide legs 58. The leg portions 62 are respectively formed so as to approach each other on progression from the base portion 14A towards the leading ends, and are configured so as to be capable of resilient deformation about base portions 62A. Leading end portions 62B of the leg portions 62 are thinner than other portions thereof.

First tapered portions 64 are provided at central portions of the pair of leg portions 62. The first tapered portions 64 are formed at regions at which the leg portions 62 overlap with a circle centered on the point X and having a radius of the straight line distance from the point X to the lower edge of the base portion 14A. The first tapered portions 64 are formed on the front side of the leg portions 62, and are formed such that the thickness of the leg portions 62 becomes thinner on progression towards the point X (see FIG. 5).

As shown in FIG. 3C, second tapered portions 66 are provided on the back side of the leg portions 62 at the leading end portions 62B of the respective leg portions 62. The second tapered portions 66 are formed such that the thickness of the leg portions 62 becomes thinner on progression towards the point Y (see FIG. 6).

Explanation follows regarding operation of the pipe fitting according to the first exemplary embodiment.

Figure 5A:
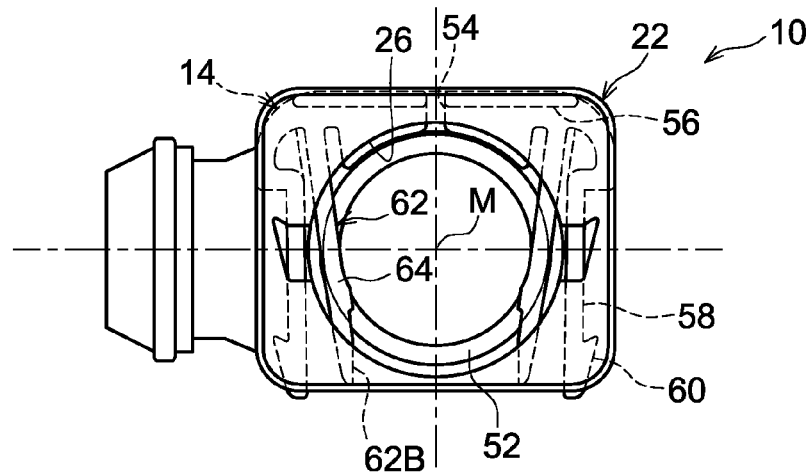
FIG. 5A is a front face view of a retainer of a pipe fitting according to the first exemplary embodiment in the first position.

As shown in FIG. 5A, the retainer 14 is inserted into the retainer insertion opening 30 of the retainer mounting portion 22. When this happens, the key groove portion 54 is inserted so as to fit around the projection portion 34 of the retainer mounting portion 22, preventing the retainer 14 from being inserted back-to-front (see FIG. 1).

In the state illustrated in FIG. 5A, the leading end portions of the guide legs 58 and the leading end portions 62B of the leg portions 62 of the retainer 14 pass by the through holes 42, 44 shown in FIG. 2B and project out from the retainer mounting portion 22. The locking hooks 60 that project out from the retainer mounting portion 22 anchor with the inclined portions 31 formed to the side walls 43 of the retainer mounting portion 22 (see FIG. 2B and FIG. 4).

The retainer 14 cannot be pushed further into the retainer mounting portion 22 than the position illustrated in FIG. 5A since the projection portions 56 formed to the upper portion of the base portion 14A make contact with an upper portion of the retainer mounting portion 22.

In this state, the first tapered portions 64 formed to the leg portions 62 extend to the inside of the connection opening 26, and a positional relationship is achieved in which a center point M of the connection opening 26 corresponds to the point X illustrated in FIG. 3B.

Figure 5B:
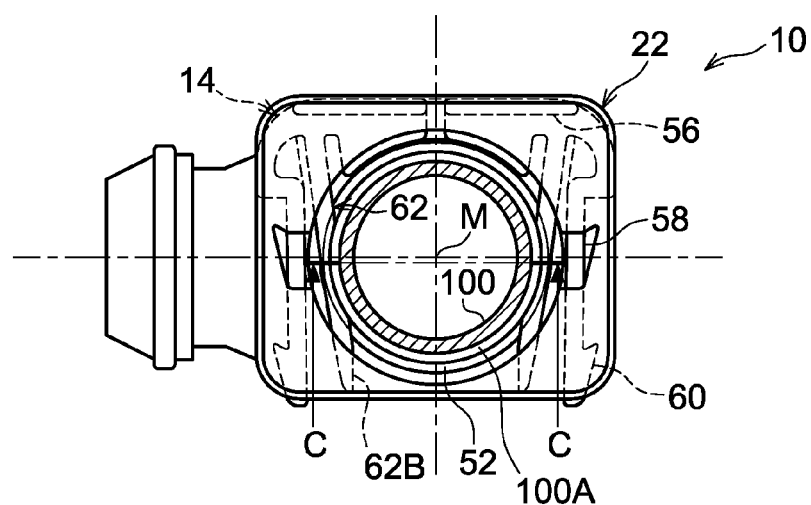
FIG. 5B is a front face view of a pipe fitting showing a state in which a pipe has been inserted into a pipe fitting according to the first exemplary embodiment.
Figure 5C:
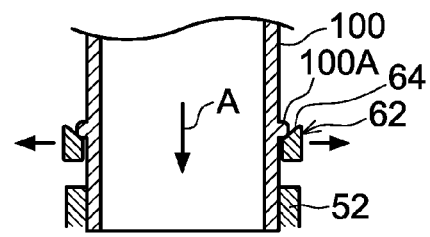
FIG. 5C is a cross-section showing a state in which a ring-shaped projection of a pipe is in contact with first tapered portions of a retainer of a pipe fitting according to the first exemplary embodiment.

At this stage, as shown in FIG. 5B and FIG. 5C, when the pipe 100 is inserted into the retainer mounting portion 22 in the direction of arrow A, the flange 100A of the pipe 100 that has passed through the connection opening 26 contacts the first tapered portions 64 of the leg portions 62. When the retainer mounting portion 22 is pushed on further, the leg portions 62 to which the first tapered portions 64 are formed are deformed so as to be pushed out to the radial direction outside of the connection opening 26 by to the flange 100A, and the flange 100A passes the leg portions 62.

Figure 5D:
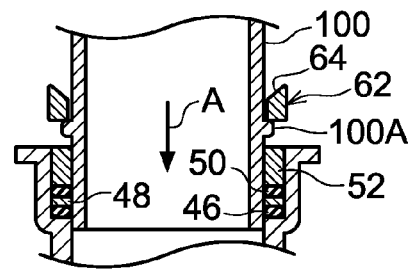
FIG. 5D is a cross-section showing an inserted state in which leg portions of a retainer of a pipe fitting according to the first exemplary embodiment have passed a ring-shaped projection of a pipe.

As shown in FIG. 5D, when the flange 100A has pushed the leg portions 62 out in the connection opening 26 radial direction and passed through, the deformed leg portions 62 recover and return to their original position, and make contact with the outer periphery of the pipe 100. In this state, even when an attempt is made to pull the pipe fitting 10 off the pipe 100 in the opposite direction to the arrow A direction, the leg portions 62 are anchored with the flange 100A since the first tapered portions 64 are not formed to the back side of the leg portions 62. Moreover, since the top hat 52 anchors the flange 100A, the pipe fitting 10 cannot be pushed on any further. Due to such a configuration, connection and prevention from coming off of the pipe 100 and the pipe fitting 10 can be performed in a single action.

Moreover, the leg portions 62 are anchored at the two locations of the base portion 14A and the leading end portions 62B, since the leading end portions 62B of the leg portions 62 are in surface contact with the hole walls of the through holes 42, 44 (see FIG. 1) of the retainer mounting portion 22. Accordingly, for example when fuel is flowing inside the pipe 100, even when pressure is applied to the pipe fitting 10 in the opposite direction to the arrow A, stress acting on the leg portions 62 is supported at the two locations of the base portion 14A side and the leading end portions 62B side. The leg portions 62 also flex less readily than in a case in which the leading end portions 62B are free ends.

Figure 6A:
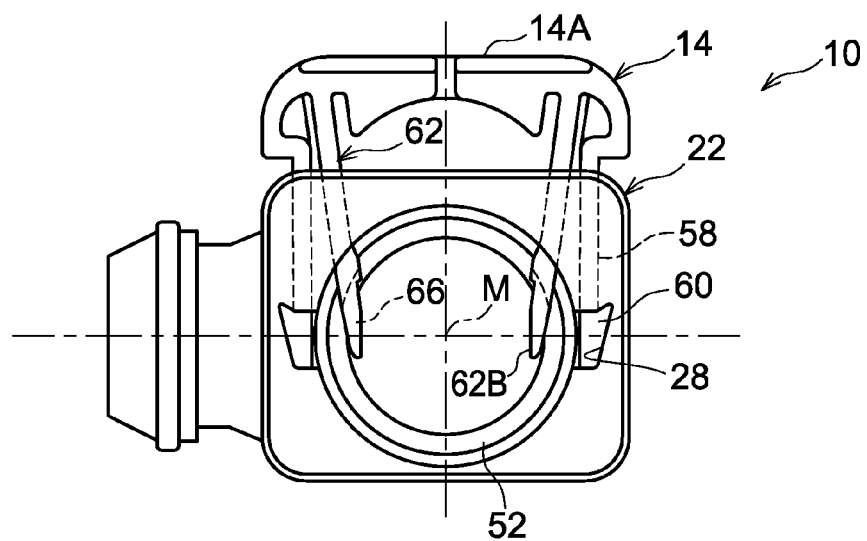
FIG. 6A is a front face view of a retainer of a pipe fitting according to the first exemplary embodiment in the second position.

Next, explanation is given regarding removal of the pipe fitting 10 from the pipe 100. Note that for ease of explanation, in the following explanation the position of the retainer 14 shown in FIG. 5 is referred to as a first position, and the position of the retainer 14 shown in FIG. 6A is referred to as a second position.

When the pipe fitting 10 is to be pulled off the pipe 100, the retainer 14 is moved in advance from the first position to the second position. Firstly, as shown in FIG. 4B, the outside of the locking hooks 60 of the guide legs 58 are pinched with the fingers and deformed towards the inside, releasing the anchored state with the side walls 43.

At this stage, when the guide legs 58 that were resiliently deformed towards the inside about the curved portions 58A recover, a component force acts as a reaction force against the fingers in the direction of the second position (in the arrow B direction), and the locking hooks 60 move towards the notches 28 whilst sliding along the inner walls of the side walls 43. The retainer 14 thus moves from the first position to the second position.

As shown in FIG. 4A, in order to move the retainer 14 from the second position to the first position, the retainer 14 is pushed towards the main body portion 12, moving the guide legs 58 in the arrow C direction. The guide legs 58 gradually resiliently deform towards the inside, and when the guide legs 58 pass the lower edge of the side walls 43, the locking hooks 60 move towards the outside due to the recovery force of the guide legs 58, and anchor against the inclined portions 31.

When the retainer 14 has been moved to the second position, it reaches the state shown in FIG. 6A. When this occurs, the entire base portion 14A of the retainer 14 projects above the retainer insertion opening 30 of the retainer mounting portion 22, and the leading end portions 62B of the leg portions 62 of the retainer 14 are positioned in the connection opening 26. In this state, a positional relationship is achieved in which the center point M of the connection opening 26 corresponds with the point Y illustrated in FIG. 3C.

Figure 6B:
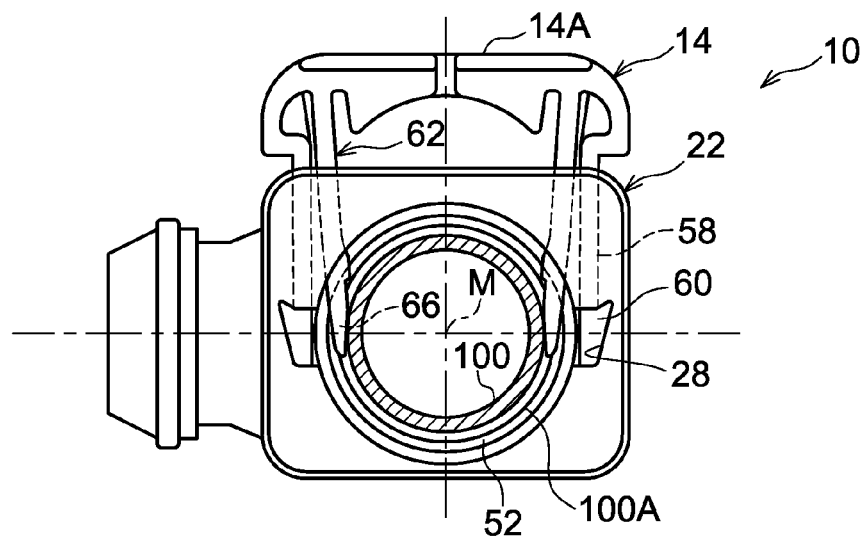
FIG. 6B is a front face view of a pipe fitting showing a state in which a pipe can be pulled out of a pipe fitting according to the first exemplary embodiment.
Figure 6C:
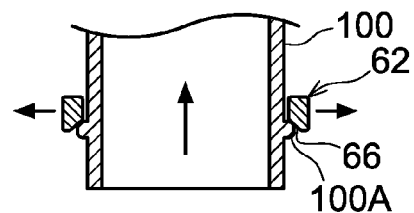
FIG. 6C is a cross-section showing a state in which second tapered portions of a retainer of a pipe fitting according to the first exemplary embodiment are in contact with a ring-shaped projection of a pipe.

In this state, when the pipe fitting 10 is being pulled off the connected pipe 100, as shown in FIG. 6B and FIG. 6C, the flange 100A and the second tapered portions 66 make contact with each other. When the pipe fitting 10 is pulled off further, the leading end portions 62B of the leg portions 62 that are in contact with the flange 100A are deformed so as to be pushed out to the radial direction outside of the connection opening 26, and the leg portions 62 pass the flange 100A.

Figure 6D:
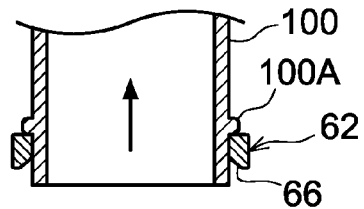
FIG. 6D is a cross-section illustrating a pulled off state in which leg portions of a retainer of a pipe fitting according to the first exemplary embodiment have passed a ring-shaped projection of a pipe.

As shown in FIG. 6D, when the flange 100A has pushed out the leg portions 62 in the connection opening 26 radial direction and passed through, the deformed leg portions 62 recover and return to their original positions, and the pipe fitting 10 can be pulled from the pipe 100.

Note that the first tapered portions 64 and the second tapered portions 66 formed to the retainer 14 of the present exemplary embodiment are formed such that the thickness becomes thinner on progression towards the point X and the point Y respectively. However the shapes of the tapered portions are not particularly limited provided that they are shapes that can be pushed out by the flange 100A. For example, the leg portions 62 may be formed such that the thickness becomes thinner uniformly from the outside edge of the leg portions 62 towards the inside edge of the leg portions 62.

The locking hooks 60 formed to the retainer 14 of the present exemplary embodiment are formed so as to face towards the retainer 14 outside. However the locking hooks 60 may be formed facing towards the retainer 14 inside provided that they are formed so as to be capable of anchoring with the main body portion 12. In such cases, the locking hooks 60 are moved in a direction away from each other in order to release the anchored state to the retainer mounting portion 22.

Next, explanation follows regarding a pipe fitting according to a second exemplary embodiment of the present invention. Note that explanation of configuration similar to the pipe fitting of the first exemplary embodiment is omitted.

Figure 7:
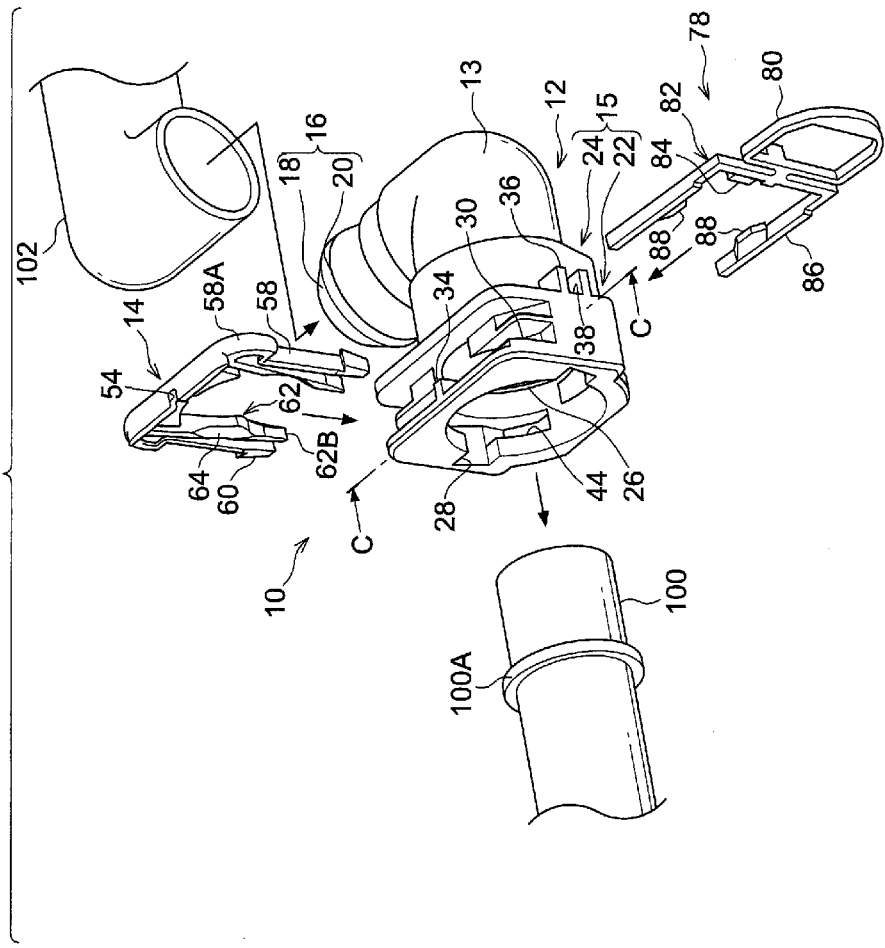
FIG. 7 is an exploded perspective view of a pipe fitting according to a second exemplary embodiment.

As shown in FIG. 7, in a pipe fitting 10 of the second exemplary embodiment, a pull tab 78 serving as a connection completion verification member is attached to a retainer mounting portion 22 in a direction orthogonal to the insertion direction of a retainer 14. The pull tab 78 is equipped with a ring shaped ring portion 80 and a C-shaped main body portion 82.

Figure 8A:
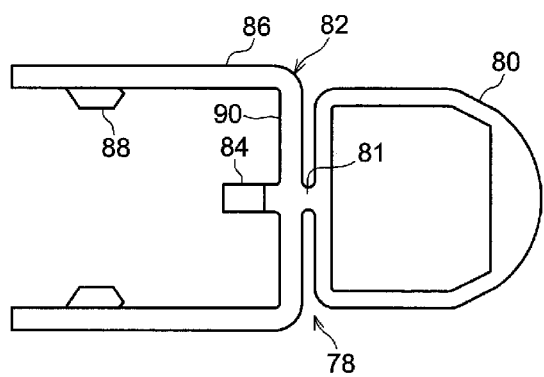
FIG. 8A is a front face view of a pull tab configuring a pipe fitting according to the second exemplary embodiment.

As shown in FIG. 8A, the main body portion 82 is configured by a base portion 90 formed at one side of the ring portion 80, and a pair of arm portions 86 extending parallel to each other from both ends of the base portion 90. The respective arm portions 86 are formed with pull tab lock hooks 88 that project out towards each other. The pull tab lock hooks 88 are formed such that the thickness becomes thinner on progression towards the leading ends.

An L-shaped positioning portion 84 that is bent around in the same direction as the arm portions 86 is formed projecting from a back face of the pull tab 78 at an intermediate portion of the base portion 90. A narrow-width snapping portion 81 is further formed between the ring portion 80 and the base portion 90.

Figure 8B:
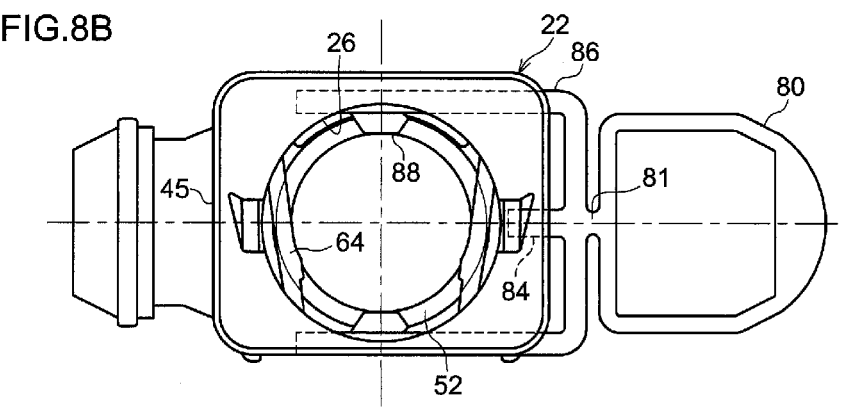
FIG. 8B is a front face view of a pipe fitting according to the second exemplary embodiment.
Figure 8C:
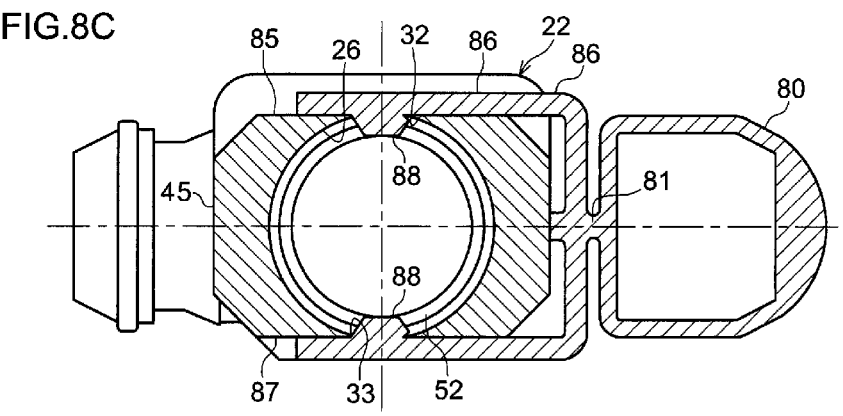
FIG. 8C is a cross-section taken along line C-C in FIG. 7 showing an inserted state of a pull tab to a pipe fitting according to the second exemplary embodiment.

As shown in FIG. 8B and FIG. 8C, in an inserted state of the pull tab 78 to the retainer mounting portion 22, the pull tab lock hooks 88 pass by through holes 32, 33, formed respectively in a top face 85 and a bottom face 87 of a right side wall 43 of the retainer mounting portion 22, and extend into a connection opening 26 from the top and bottom.

The positioning portion 84 formed to the base portion 90 contacts the side wall 43, such that the pull tab 78 is not able to move in the insertion and removal directions by the pull tab lock hooks 88 and the positioning portion 84.

As shown in FIG. 7, the positioning portion 84 is inserted into and positioned by a groove portion 38 formed between projection portions 36 formed to a side face of the retainer mounting portion 22. The pull tab 78 is accordingly prevented from moving in a direction orthogonal to the insertion and pulling out direction.

Explanation follows regarding operation of the pipe fitting according to the second exemplary embodiment.

Figure 9A:
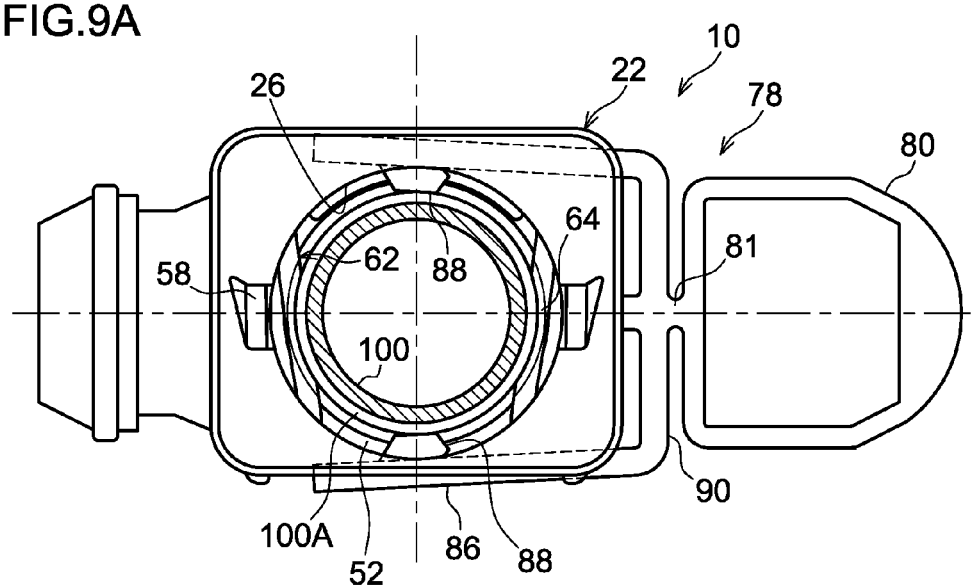
FIG. 9A is a front face view showing a state in which a pipe is connected to a pipe fitting according to the second exemplary embodiment.
Figure 9B:
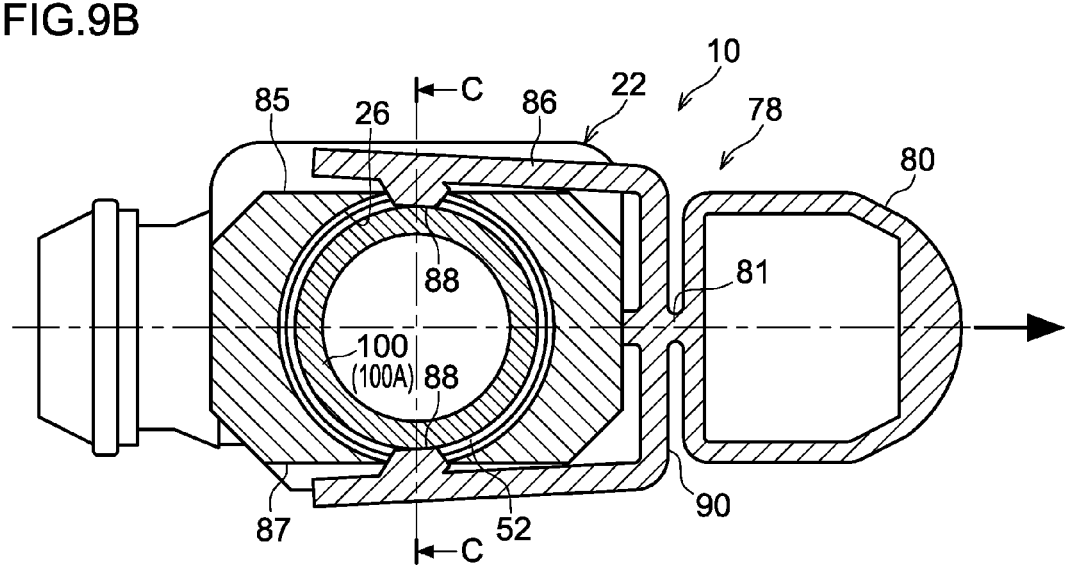
FIG. 9B is a cross-section taken along line C-C in FIG. 7 showing a state in which a pipe has been connected to a pipe fitting according to the second exemplary embodiment.

As shown in FIG. 9A, when the pipe fitting 10 is inserted over the pipe 100, as explained in the first exemplary embodiment, first tapered portions 64 of the retainer 14 in a first position contact the flange 100A, and are pushed out towards the connection opening 26 radial direction outside. When leg portions 62 pass the flange 100A, the flange 100A contacts the pull tab lock hooks 88, and as shown in FIG. 9B, the pull tab lock hooks 88 are pushed out towards the connection opening 26 radial direction outside.

Figure 9C:
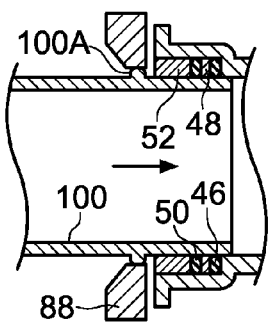
FIG. 9C is a cross-section taken along line C-C in FIG. 9B illustrating a state in which a pipe has been connected to a pipe fitting according to the second exemplary embodiment.

When this occurs, as shown in FIG. 9C, the flange 100A contacts the top hat 52 and cannot move any further in the axial direction. The pull tab lock hooks 88 are thereby maintained in the pushed out state by the flange 100A.

Due to the pull tab lock hooks 88 being pushed out by the flange 100A, the locked state is released between the pull tab lock hooks 88 and the hole walls in the top face 85 and the bottom face 87. The pull tab 78 can be removed from the retainer mounting portion 22 in this state by grasping the ring portion 80 and pulling the pull tab 78 in the direction of the arrow in the drawing.

However when there is an attempt to pull off the pull tab 78 from the retainer mounting portion 22 in a state in which the connection of the pipe fitting 10 has not yet been completed, the narrow-width snapping portion 81 snaps, and only the ring portion 80 can be pulled off with the main body portion 90 remaining in an inserted state.

By attaching such a pull tab 78 to the pipe fitting 10, when a unit assembled employing plural pipe fittings is inspected during an inspection performed after an assembly process of a unit such as a liquid carrying pipe, connection completion verification can be performed by confirming that no non-removed connection completion verification members remain.

Note that in the present exemplary embodiment, the pull tab 78 is inserted from the right side wall 43 side, however since the retainer mounting portion 22 is configured with a left and right symmetrical shape, the pull tab 78 may also be inserted from a left side wall 45 side.

In the present exemplary embodiment, the pull tab 78 is employed as the connection completion verification member. However, for example, a member such as a push tab may be employed provided that it is a member capable of verifying that connection is complete by releasing an anchored state to the retainer mounting portion 22 by insertion over the pipe 100. In such cases, connection completion verification can be performed since it becomes possible to push the connection completion verification member further into the retainer mounting portion 22 when the anchored state with the retainer mounting portion 22 is released.

Explanation has been given above regarding a first exemplary embodiment and a second exemplary embodiment of the present invention. However the present invention is not limited to these exemplary embodiments and it goes without saying that combinations of the exemplary embodiments may be employed, and various embodiments may be implemented within a range not departing from the spirit of the present invention. For example, plural of the leg portions 62 of the retainer 14 may be provided in the retainer 14 thickness direction. In such cases, the leg portions 62 would flex even less readily when pressure was applied in the pulling-off direction of the inserted pipe 100 with the retainer 14 in the first position.

Japanese Patent Application No. 2011-168629 is incorporated herein by reference. All publications, patent applications, and technical standards mentioned in this specification are herein incorporated by reference to the same extent as if each individual publication, patent application, or technical standard was specifically and individually indicated to be incorporated by reference.

The invention claimed is:

1. A pipe fitting, comprising:
   a main body portion formed with a connection opening into which is inserted a pipe provided with a ring-shaped projection at an outer periphery thereof;
   a retaining member attached to the main body portion so as to be capable of movement between a first position and a second position in a radial direction of the connection opening, wherein the retaining member is provided with a locking section that anchors to the main body portion in the first position and the second position;
   a pair of leg portions that are provided at the retaining member and that jut out into the connection opening and engage a ring-shaped projection of the inserted pipe so as to prevent the pipe from being pulled out when the retaining member is in the first position;
   wherein the locking section comprises a pair of arm members extending toward an outer side of the leg portions with locking hooks formed at leading end portions of the arm members, the locking hooks anchoring to anchor holes in the main body portion when the retaining member is in the first position or the second position, and the anchoring with the anchor holes is released when the locking hooks anchored to the anchor holes in the first position are moved in a direction approaching each other and the retaining member moves towards the second position due to a recovery force of the arm members attempting to return to their original orientation;
   first tapered portions that are formed at front sides of the leg portions, the front sides of the leg portions being configured to be oriented toward an entrance side in a pipe insertion direction at the retaining member, and the first tapered portions making contact with the ring-shaped projection of the pipe that is being inserted into the connection opening, deforming the leg portions toward an outer side in the radial direction and allowing the ring-shaped projection to pass by when the retaining member is in the first position; and second tapered portions that are formed at back sides of the leg portions, the back sides of the leg portions being configured to be oriented toward an inner side in the pipe insertion direction at the retaining member, and the second tapered portions making contact with the ring-shaped projection of the pipe that is being pulled out from the connection opening, deforming the leg portions toward the outer side in the radial direction and allowing the ring-shaped projection to pass when the retaining member is in the second position, wherein the first tapered portions are located at central portions of the leg portions and the second tapered portions are located at leading end portions of the leg portions.

2. The pipe fitting of claim 1, wherein leading end portions of the leg portions are in contact with the main body portion when the retaining member is in the first position.

3. The pipe fitting of claim 1, further comprising a connection completion verification member that is attached to the main body portion, anchoring of the connection completion verification member to the main body portion being released by contact with the ring-shaped projection of the pipe that has been inserted into the connection opening and has passed the first tapered portions such that the connection completion verification member is able to be removed from the main body portion or tucked into the main body portion.

4. The pipe fitting of claim 1, wherein the arm members and the leg portions are separated from one another.

* * * * *